(12) United States Patent
Rule et al.

(10) Patent No.: US 10,963,865 B1
(45) Date of Patent: Mar. 30, 2021

(54) AUGMENTED REALITY CARD ACTIVATION EXPERIENCE

(71) Applicant: Capital One Services, LLC, McLean, VA (US)

(72) Inventors: Jeffrey Rule, Chevy Chase, MD (US); Kevan Emmott, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/872,572

(22) Filed: May 12, 2020

(51) Int. Cl.
| | |
|---|---|
| *G06Q 20/34* | (2012.01) |
| *G06Q 40/02* | (2012.01) |
| *G06T 19/00* | (2011.01) |
| *G06Q 20/32* | (2012.01) |

(52) U.S. Cl.
CPC ..... *G06Q 20/3552* (2013.01); *G06Q 20/3276* (2013.01); *G06Q 20/352* (2013.01); *G06Q 20/3558* (2013.01); *G06Q 40/02* (2013.01); *G06T 19/006* (2013.01)

(58) Field of Classification Search
CPC ............... G06Q 20/3552; G06Q 40/02; G06Q 20/3558; G06Q 20/352; G06Q 20/3276; G06T 19/006
See application file for complete search history.

(56) References Cited

U.S. PATENT DOCUMENTS

| | | | |
|---|---|---|---|
| 4,683,553 A | 7/1987 | Mollier | |
| 4,827,113 A | 5/1989 | Rikuna | |
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |
| 5,592,553 A | 1/1997 | Guski et al. | |
| 5,616,901 A | 4/1997 | Crandall | |
| 5,666,415 A | 9/1997 | Kaufman | |
| 5,763,373 A | 6/1998 | Robinson et al. | |
| 5,764,789 A | 6/1998 | Pare, Jr. et al. | |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Seung H Lee

(74) *Attorney, Agent, or Firm* — Kacvinsky Daisak Bluni PLLC

(57) ABSTRACT

Various embodiments are generally directed to enhancing a card activation experience for an authorized card user when activating a new card by at least displaying various types of information related to the new card in augmented reality (AR) and allowing the user to perform the activation itself or experience other aspects of the activation process in AR. Information pertaining the successful activation of the card may also be provided to the user in AR.

20 Claims, 11 Drawing Sheets

(56) References Cited

U.S. PATENT DOCUMENTS

| | | |
|---|---|---|
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |

(56) References Cited

U.S. PATENT DOCUMENTS

| | | |
|---|---|---|
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,477,852 B1 * | 10/2016 | Neale .................. G06Q 20/409 |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |

(56) References Cited

U.S. PATENT DOCUMENTS

| | | |
|---|---|---|
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |

(56) References Cited

U.S. PATENT DOCUMENTS

| | | |
|---|---|---|
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0174134 A1* | 6/2018 | Carpenter ............ G06Q 20/354 |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

(56) References Cited

OTHER PUBLICATIONS

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?d=576a7b910d2d6&location=browse, 135 pages.
Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 retrieved on [Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application, International Journal of Advanced Computer Science and Applications," 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

\* cited by examiner

AUGMENTED REALITY CARD ACTIVATION EXPERIENCE

BACKGROUND

When a new card (e.g., debit card, credit card, etc.) arrives in the mail, an authorized user is required to activate the card in order to use it. There are various forms of activation. For example, the user can activate the card by calling a telephone number indicated on a sticker adhered to the card, performing various authentication steps, and speaking with a live or automated agent. In another example, the user can activate the card by opening up a web browser, logging in the user's online account, performing various authentication steps, and pressing an activation icon. In either example, the activation experience can be uninformative and dull.

SUMMARY

Various embodiments are generally directed to enhancing a card activation experience for an authorized card user when activating a new card by at least displaying various types of information related to the new card in augmented reality (AR) and allowing the user to perform the activation itself or experience other aspects of the activation process in AR. Information pertaining the successful activation of the card may also be provided to the user in AR.

DETAILED DESCRIPTION

Figure 1A:
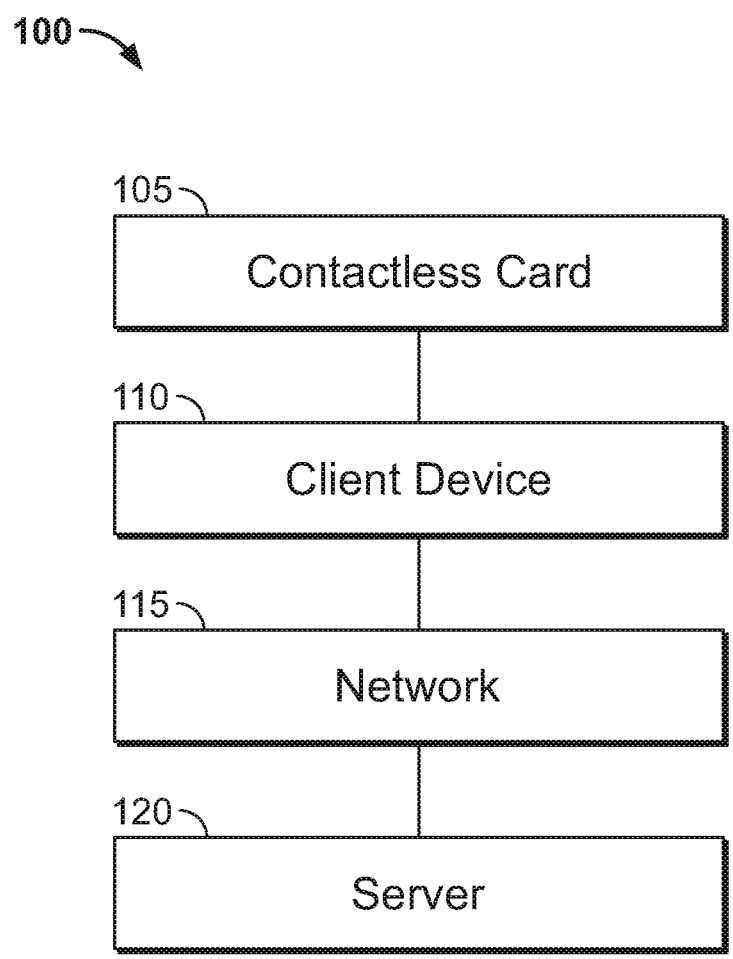
FIG. 1A illustrates an example data transmission system in accordance with one or more embodiments.

Various embodiments are generally directed to enhancing the card activation experience for an authorized card user by at least displaying various types of information related to the new card in augmented reality (AR) and allowing the user to perform the activation or experience various aspects of the activation process in AR.

In embodiments, during the activation experience, various information and selectable options related to the card may be displayed in AR. For instance, if the card is a credit card, information such as the annual percentage rate (APR) of the card, credit limit, payment due date, or the like may be displayed around or adjacent to the card in AR. Other types of information may also be displayed in AR, such as information associated with one or more different types of components (e.g., hardware, software, etc.) contained in the card or various graphics (e.g., contactless graphic) depicted on the card. In another instance, selectable options related to the card such as adding or removing authorized users or setting up auto payment may also be displayed in AR. Moreover, instructions related to the activation process may be displayed and experienced in AR. It may be understood that, in AR, the information and selectable options may remain in predefined display positions relative to the card even if the physical position of the camera changes.

In embodiments, upon an authorized card user (e.g., banking customer) receiving a new card (e.g., credit card, debit card, business card), the user may tap the card to the user's mobile device (e.g., smartphone). When the card is tapped to the mobile device, the mobile device may read a uniform resource locator (URL) from the card via near field communication (NFC). In examples, the URL may direct the user to a download location for downloading a banking application (otherwise referred to herein as "banking app") if the banking application is not already on the mobile device. If the user already has the banking app on the mobile device, the banking app may be launched instead. It may be understood that the term "tap" or "tapped" may broadly be referred to as brining the card physically close to the mobile device such that the NFC reader coil of the mobile device can read or receive data from the card.

For example, the banking app may launch upon download and the user may be guided through a registration process if the user is a new customer. Otherwise, existing customer may login to the banking app. As will be further described below, existing customers may be able to login to the banking app using "one-tap" authentication, which is a highly secure way of verifying user identity to ensure, for example, that is the user who is actually logging in to the banking app and not a fraudster.

In embodiments, the card activation experience may begin in the banking app. For instance, the user may be instructed to point a camera of the mobile device at the card. As described above, various types of information related to the card and/or user selectable options may be displayed in AR. In a further instance, in AR, the border of the card may be outlined in a first color (e.g., red) to indicate that the card has not yet been activated. Instructions may also be provided to user in AR for completing the activation process. In one example, the user may again tap the card to the mobile device, which proceeds to activate the card. When the card is placed back in front of the camera, the border of the card may be outlined in a second color different from the first color (e.g., green) to indicate that the card has been activated. In another example, while in AR view, the user can physically tap the card with a finger, which completes the activation process. The border of the card can again be outlined in a particular color.

In previous solutions, the card activation experience lacked excitement and was generally uninformative. The embodiments and examples described herein overcome and are advantageous over the previous solutions in that a user can experience card activation in new, exciting, and informative ways. Allowing the user to interact with the card in AR during card activation engages the user in the process. Moreover, it is advantageous in allowing the user to change card-related options, such as the addition or subtraction of authorized users or setting up auto payment, also enhances the activation experience.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example data transmission system according to one or more embodiments. As further discussed below, system 100 may include contactless card 105, client device 110, network 115, and server 120. Although FIG. 1A illustrates single instances of the components, system 100 may include any number of components.

System 100 may include one or more contactless cards 105, which are further explained below with reference to FIG. 3A and FIG. 3B. In some embodiments, contactless card 105 may be in wireless communication, utilizing NFC in an example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. Client device 110 also may be a mobile computing device, for example, an iPhone, iPod, iPad from Apple® or any other suitable device running Apple's iOS® operating system, any device running Microsoft's Windows® Mobile operating system, any device running Google's Android® operating system, and/or any other suitable mobile computing device, such as a smartphone, a tablet, or like wearable mobile device.

The client device 110 device can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 802.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to memory. Server 120 may be configured as a central system, server or platform to control and call various data at different times to execute a plurality of workflow actions. Server 120 may be configured to connect to the one or more databases. Server 120 may be connected to at least one client device 110.

Figure 1B:
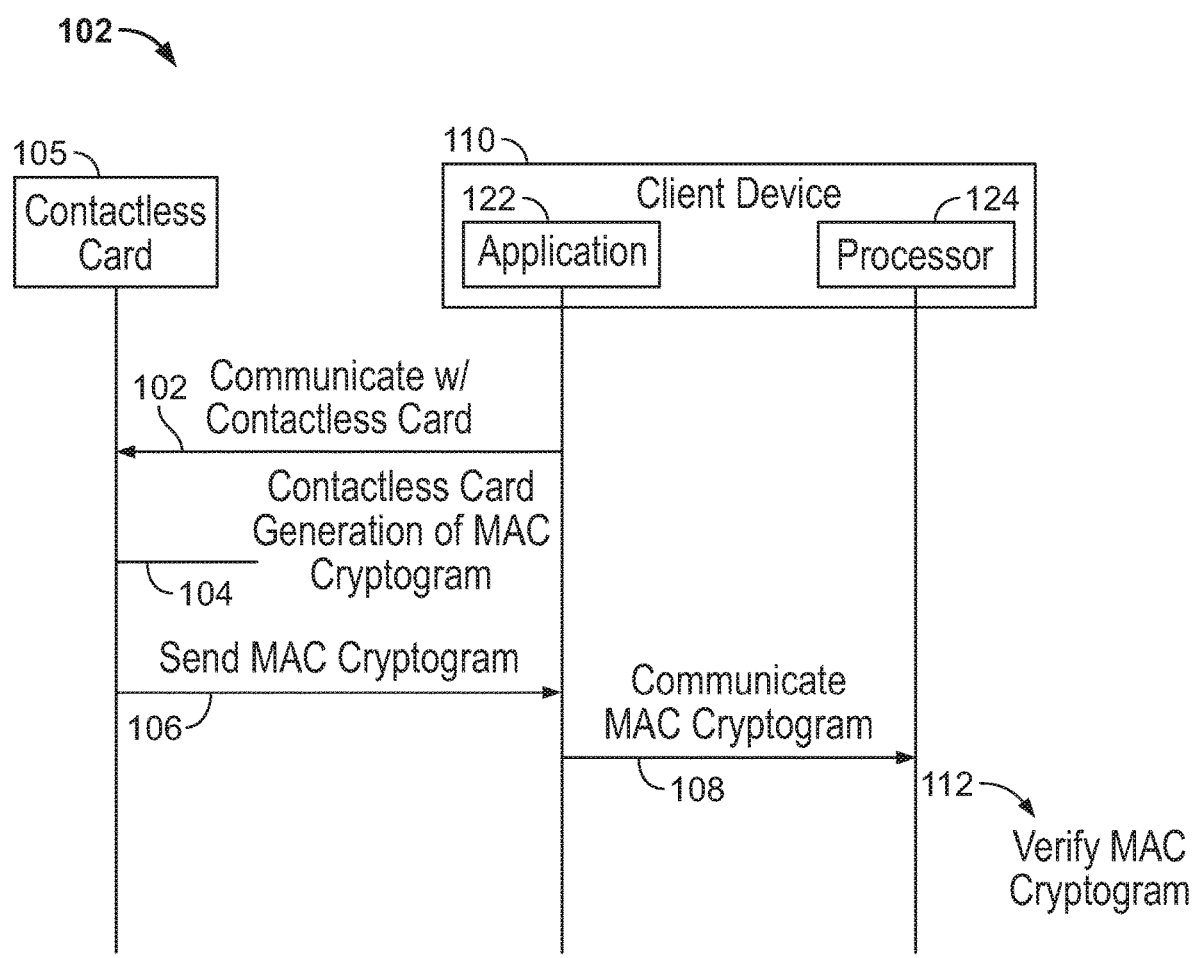
FIG. 1B illustrates an example sequence diagram for providing authenticated access in accordance with one or more embodiments.

FIG. 1B illustrates an example sequence diagram for providing authenticated access according to one or more embodiments. The diagram may include contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format.

For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file," "Read Capabilities file," and "Select NDEF file." At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124. At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a server 120 in data communication with the client device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

It may be understood that in some examples, the contactless card 105 may initiate communication after the contactless card is brought near the client device 110. By way of example, the contactless card 105 may send the client device 110 a message, for instance, indicating that the contactless card has established communication. Thereafter, the application 122 of client device 110 may proceed to communicate with the contactless card at step 102, as described above.

Figure 2:
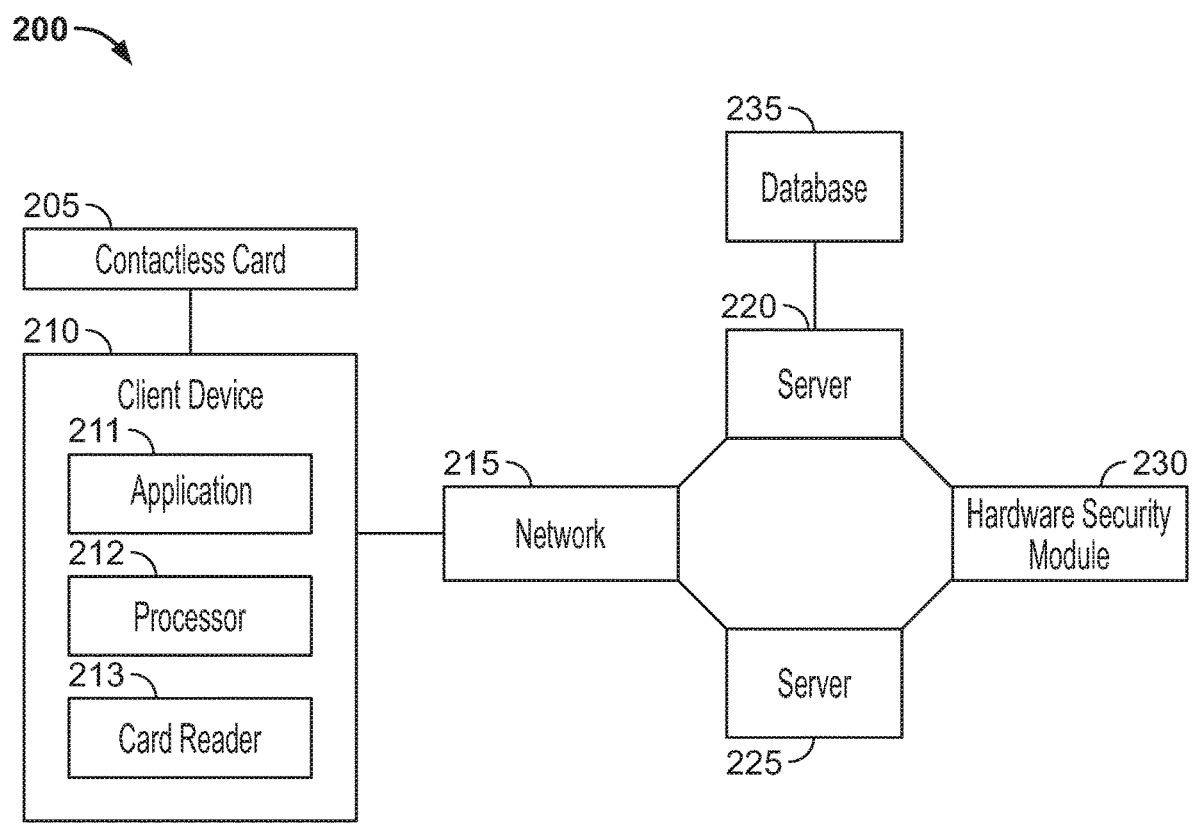
FIG. 2 illustrates an example system using a contactless card in accordance with one or more embodiments.

FIG. 2 illustrates an example system 200 using a contactless card. System 200 may include a contactless card 205, one or more client devices 210, network 215, servers 220, 225, one or more hardware security modules 230, and a database 235. Although FIG. 2 illustrates single instances of the components, system 200 may include any number of components.

System 200 may include one or more contactless cards 205, which are further explained below with respect to FIG. 3A and FIG. 3B. In some examples, contactless card 205 may be in wireless communication, for example NFC communication, with client device 210. For example, contactless card 205 may include one or more chips, such as a radio frequency identification chip, configured to communication via NFC or other short-range protocols. In other embodiments, contactless card 205 may communicate with client device 210 through other means including, but not limited to, Bluetooth, satellite, Wi-Fi, wired communications, and/ or any combination of wireless and wired connections. According to some embodiments, contactless card 205 may be configured to communicate with card reader 213 (which may otherwise be referred to herein as NFC reader, NFC card reader, or reader) of client device 210 through NFC when contactless card 205 is within range of card reader 213. In other examples, communications with contactless card 205 may be accomplished through a physical interface, e.g., a universal serial bus interface or a card swipe interface.

System 200 may include client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, a client device 110 as described with reference to FIG. 1A or FIG. 1B.

Client device 210 may be in communication with one or more servers 220 and 225 via one or more networks 215. Client device 210 may transmit, for example from an application 211 executing on client device 210, one or more requests to one or more servers 220 and 225. The one or more requests may be associated with retrieving data from one or more servers 220 and 225. Servers 220 and 225 may receive the one or more requests from client device 210. Based on the one or more requests from client device 210, one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests.

System 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead are maintained within the HSM 230. For example, one or more HSMs 230 may be configured to perform at least one of key derivations, decryption, and MAC operations. The one or more HSMs 230 may be contained within, or may be in data communication with, servers 220 and 225.

System 200 may include one or more networks 215. In some examples, network 215 may be one or more of a wireless network, a wired network or any combination of wireless network and wired network, and may be configured to connect client device 210 to servers 220 and/or 225. For example, network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 205 and client device 210 may include NFC communication, cellular network between client device 210 and a carrier, and Internet between the carrier and a back-end.

In addition, network 215 may include, without limitation, telephone lines, fiber optics, IEEE Ethernet 802.3, a wide area network, a wireless personal area network, a local area network, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may include a plurality of interconnected networks, such as, for example, the Internet, a service provider's network, a cable television network, corporate networks, such as credit card association networks, and home networks.

In various examples according to the present disclosure, client device 210 of system 200 may execute one or more applications 211, and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 2, any number of devices 210 may be used. Card reader 213 may be configured to read from and/or communicate with contactless card 205. In conjunction with the one or more applications 211, card reader 213 may communicate with contactless card 205. In examples, the card reader 213 may include circuitry or circuitry components, e.g., NFC reader coil, that generates a magnetic field to allow communication between the client device 210 and the contactless card 205.

The application 211 of any of client device 210 may communicate with the contactless card 205 using short-range wireless communication (e.g., NFC). The application 211 may be configured to interface with a card reader 213 of client device 210 configured to communicate with a contactless card 205. As should be noted, those skilled in the art would understand that a distance of less than twenty centimeters is consistent with NFC range.

In some embodiments, the application 211 communicates through an associated reader (e.g., card reader 213) with the contactless card 205.

In some embodiments, card activation may occur without user authentication. For example, a contactless card 205 may communicate with the application 211 through the card reader 213 of the client device 210 through NFC. The communication (e.g., a tap of the card proximate the card reader 213 of the client device 210) allows the application 211 to read the data associated with the card and perform an activation. In some cases, the tap may activate or launch application 211 and then initiate one or more actions or communications with an account server 225 to activate the card for subsequent use. In some cases, if the application 211 is not installed on client device 210, a tap of the card against the card reader 213 may initiate a download of the application 211 (e.g., navigation to an application download page). Subsequent to installation, a tap of the card may activate or launch the application 211, and then initiate (e.g., via the application or other back-end communication) activation of the card. After activation, the card may be used in various transactions including commercial transactions.

According to some embodiments, the contactless card 205 may include a virtual payment card. In those embodiments, the application 211 may retrieve information associated with the contactless card 205 by accessing a digital wallet implemented on the client device 210, wherein the digital wallet includes the virtual payment card. In some examples, virtual payment card data may include one or more static or dynamically generated virtual card numbers.

Server 220 may include a web server in communication with database 235. Server 225 may include an account server. In some examples, server 220 may be configured to validate one or more credentials from contactless card 205 and/or client device 210 by comparison with one or more credentials in database 235. Server 225 may be configured to authorize one or more requests, such as payment and transaction, from contactless card 205 and/or client device 210.

Figure 3A:
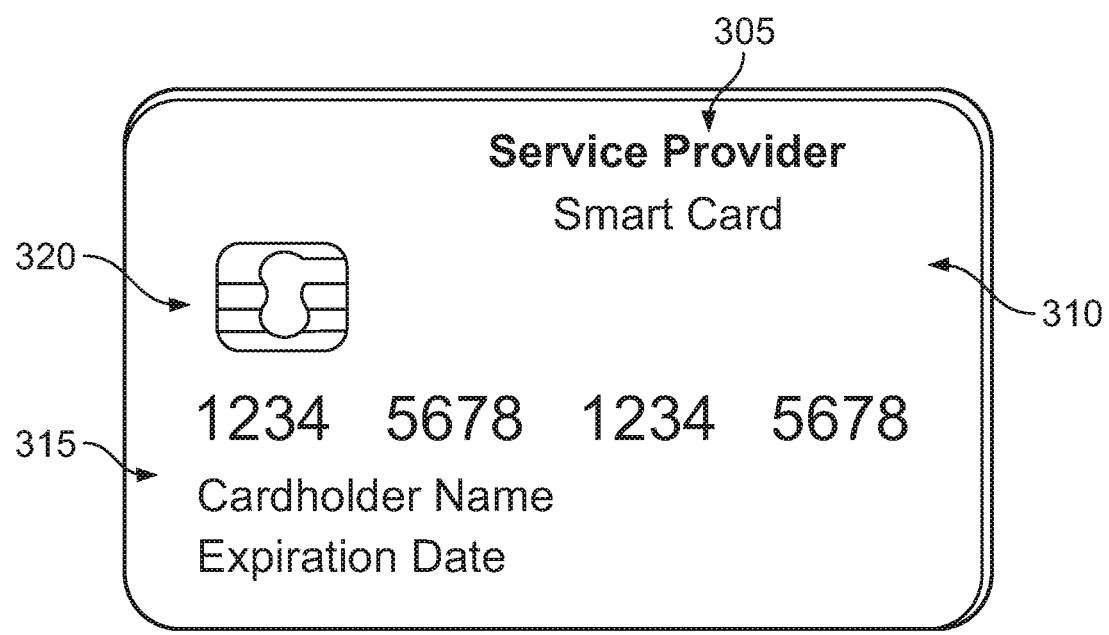
FIG. 3A illustrates an example contactless card in accordance with one or more embodiments.

FIG. 3A illustrates one or more contactless cards 300, which may include a payment card, such as a credit card, debit card, or gift card, issued by a service provider 305 displayed on the front or back of the card 300. In some examples, the contactless card 300 is not related to a payment card, and may include, without limitation, an identification card. In some examples, the payment card may include a dual interface contactless payment card. The contactless card 300 may include a substrate 310, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 300 according to the present disclosure may have different characteristics, and the present disclosure does not require a contactless card to be implemented in a payment card.

The contactless card 300 may also include identification information 315 displayed on the front and/or back of the card, and a contact pad 320. The contact pad 320 may be configured to establish contact with another communication device, such as a user device, smart phone, laptop, desktop, or tablet computer. The contactless card 300 may also include processing circuitry, antenna and other components not shown in FIG. 3A. These components may be located behind the contact pad 320 or elsewhere on the substrate 310. The contactless card 300 may also include a magnetic strip or tape, which may be located on the back of the card (not shown in FIG. 3A).

Figure 3B:
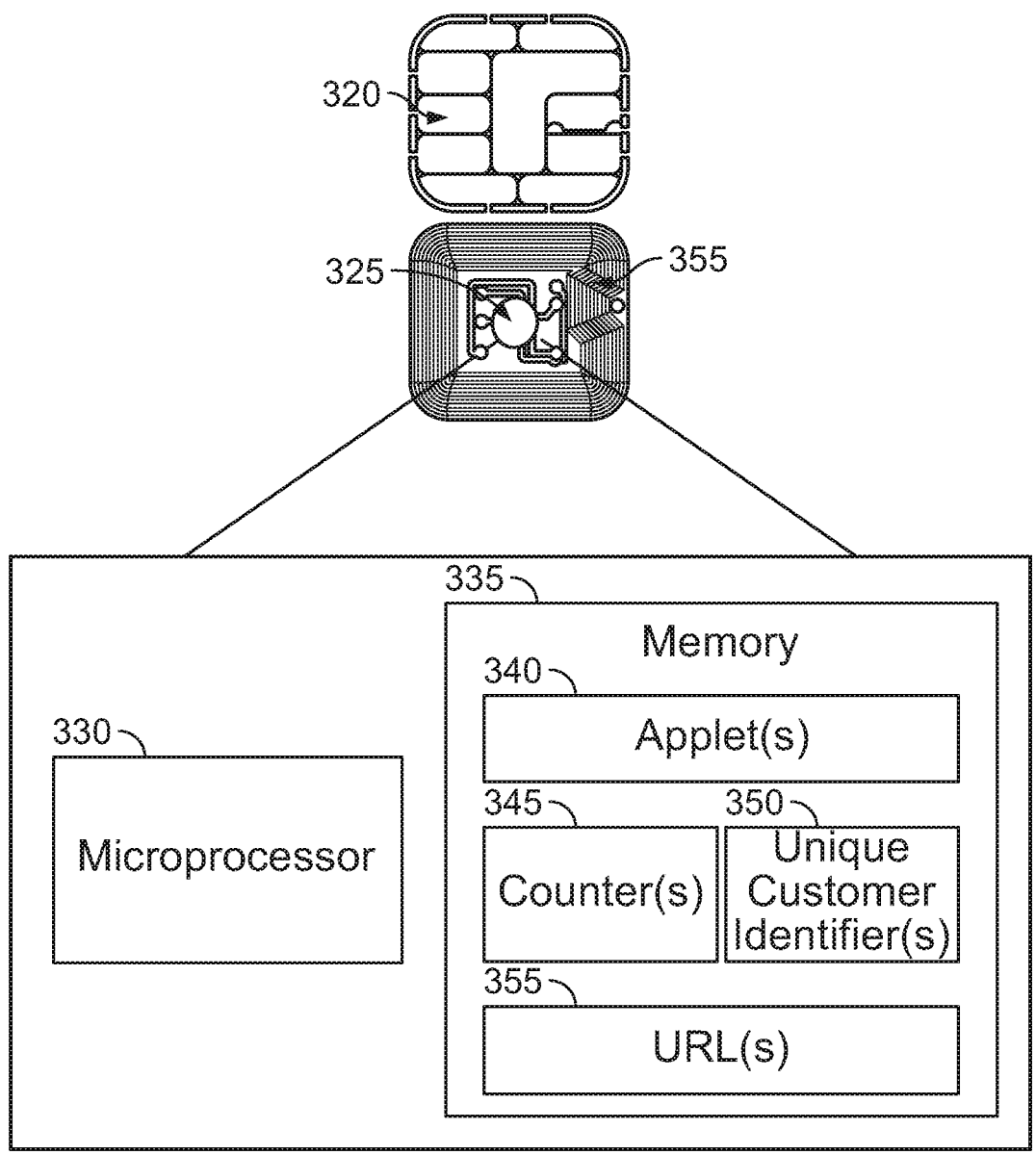
FIG. 3B illustrates an example contact pad of a contactless card in accordance with one or more embodiments.

As illustrated in FIG. 3B, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 335 may be configured to store one or more applets 340, one or more counters 345, one or more diversified keys 347, one or more customer identifiers 350, and one or more uniform resource locators (URLs). The one or more applets 340 may include one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may include a numeric counter sufficient to store an integer. As will be further described below, the one or more diversified keys 347 may be used to encrypt various information, such as information about the user or customer (e.g., customer identifier 450) to generate cryptogram(s) that can be sent to, for example, a mobile device for at least authentication purposes. The customer identifier 350 may include a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account. The one or more URLs 355 may include unique addresses associated with a World Wide Web page or the like, and in some instance, may be generated by the processing circuitry 325 based on a URL generation event (e.g., the card 300 is tapped to a computing device).

The processor and memory elements of the foregoing exemplary embodiments are described with reference to the contact pad, but the present disclosure is not limited thereto. It is understood that these elements may be implemented outside of the pad 320 or entirely separate from it, or as further elements in addition to processor 330 and memory 335 elements located within the contact pad 320.

In some examples, the contactless card 300 may include one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that includes a cryptographically secure OTP encoded as an NDEF text tag.

In examples, when preparing to send data (e.g., to a mobile device, to a server, etc.), the contactless card 300 may increment a counter value of a counter of the one or more counters 345. The contactless card 300 may then provide a master key, which may be a distinct key stored on the card 300, and the counter value as input to a cryptographic algorithm, which produces a diversified key as output, which may be one of the diversified keys 347. It is understood that the master key and the counter value is also stored in memory of a device or component receiving data from the contactless card 300 so as to decrypt the data using the diversified key that was used by the card to encrypt the transmitted data. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 300 may then encrypt the data (e.g., the customer identifier 350 and any other data) using the diversified key in the form of one or more cryptograms that can be sent to a mobile device, for example, as NFC data exchange format (NDEF) messages. The contactless card

300 may then transmit the encrypted data (e.g., cryptograms) to the mobile device, which can then decrypt the cryptograms using the diversified key (e.g., the diversified key generated by the mobile device using the counter value and the master key stored in memory thereof).

Figure 4:
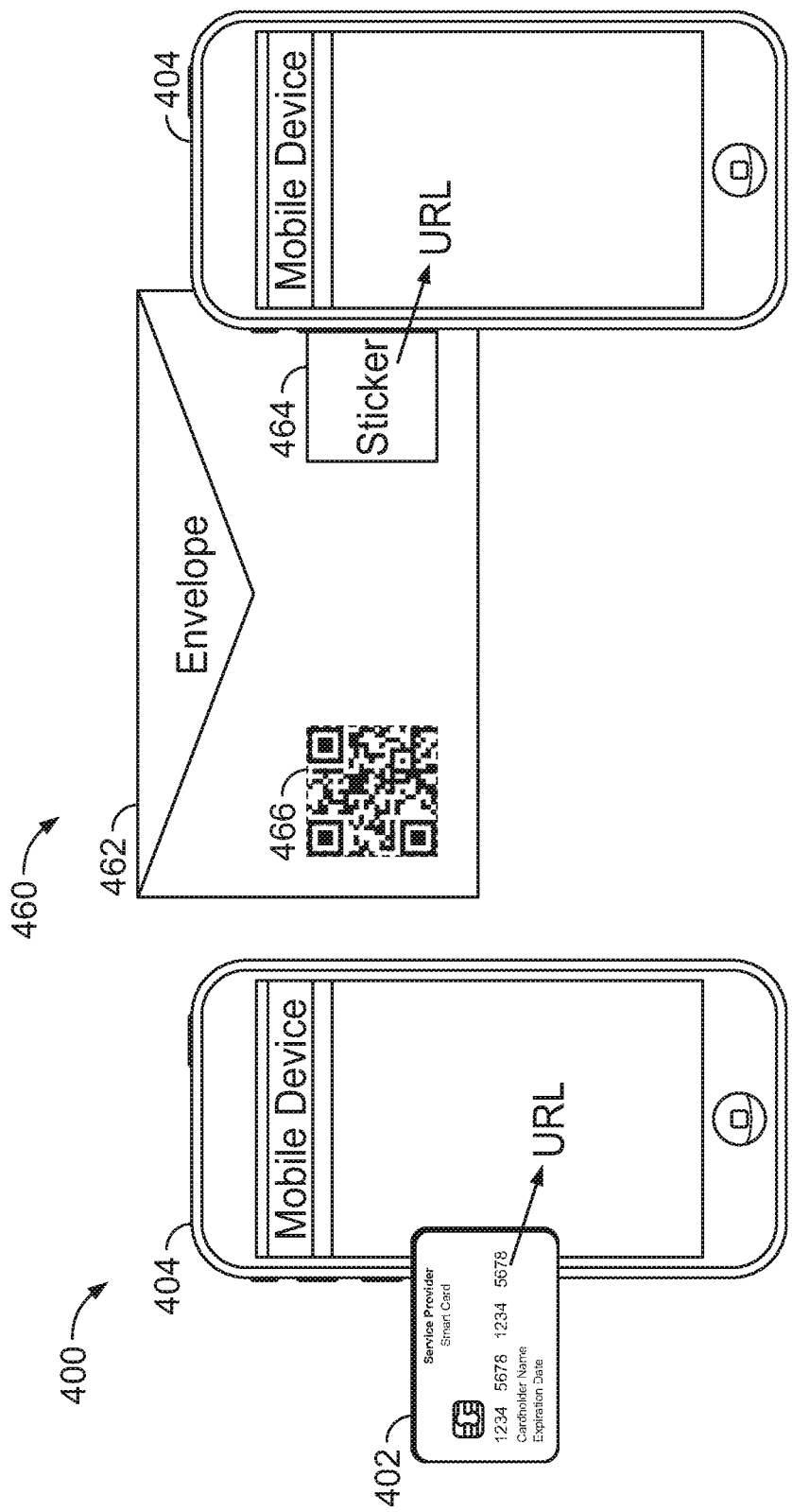
FIG. 4 illustrate example URL readings in accordance with one or more embodiments.

FIG. 4 illustrates example URL readings 400 and 460 according to one or more embodiments. In one example, an authorized card user may receive a new card 402 (e.g., credit card, debit card, contactless card). To start the activation experience, the user may be instructed to tap the card 402 to the user's mobile device 404 (e.g., smartphone, tablet, any portable computing device). In some examples, the instructions may be presented to the user by way of a sticker adhered to the card 402. It may be understood that tapping the card 402 to the mobile device 404 may broadly refer to the card being in sufficient or requisite proximity to the mobile device 404 such that at least one near field communication (NFC) reader coil of the mobile device 404 is able to communicate (e.g., read or receive data) with the card 402. As shown in URL reading 400, when the card 402 is tapped to or brought near the mobile device 404, the mobile device 404 can read or receive a URL from the card 402. For instance, the URL may be one or more of the URLs 355 stored in card 300, as described above with respect to FIG. 3B.

In another example, the authorized card user may receive the new card 402 in an envelope 462 (e.g., in the mail). As illustrated in URL reading 460, the envelope 462 may include a sticker 464, or in some examples, a Quick Response (QR) code 466 (as shown by the dashed lines). The sticker 464 or the QR code 466 may be placed or arranged inside of the envelope 462 for security purposes, which can be accessed by tearing or ripping the envelope 462 open. In other instance, the sticker 464 or QR code 466 may be provided on separate paper, which the authorized user can pull out of the envelope 462.

The user may then be instructed to tap the mobile device 404 to the sticker 464 (or, vise verse, tap the sticker 464 to the mobile device 404) to read or receive the URL. In embodiments, the sticker 464 may be an NFC-enabled sticker that provides the URL via NFC communication. In other embodiments, the sticker may include a graphic that can be scanned by the mobile device 404 allowing the device 404 to obtain the URL. For instance, the graphic can be the URL itself, which the camera of the mobile device 404 can be configured to read. The QR code 466 may provide similar functionalities as the sticker 464, which can be read or scanned by the camera of the mobile device 404 to acquire the URL.

Figure 5:
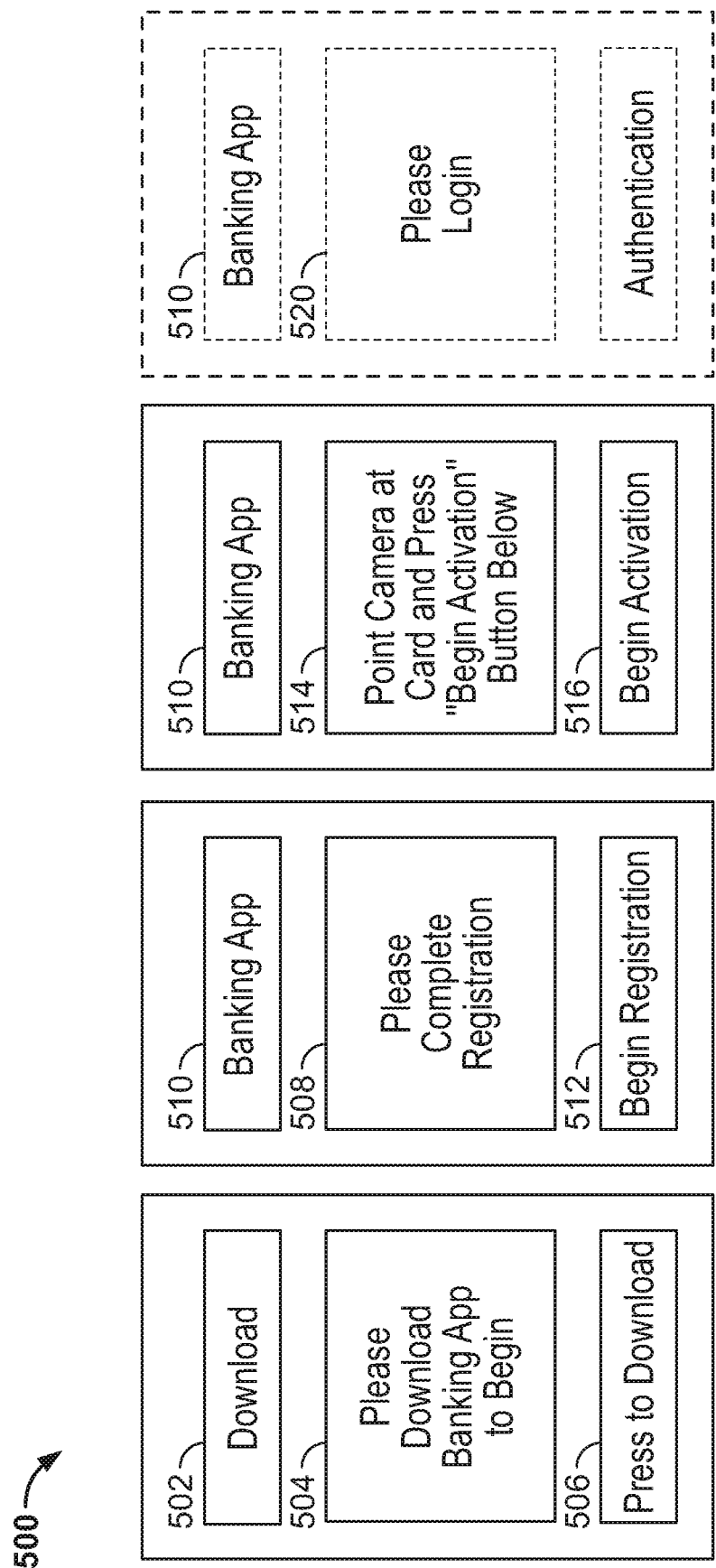
FIG. 5 illustrates an example interface flow for downloading a banking app, user registration, and card activation initiation in accordance with one or more embodiments.

FIG. 5 illustrates an example interface flow 500 for downloading a banking app, user registration, and card activation initiation according to one or more embodiments. Upon reading or receiving a URL from the card (or sticker or QR code), as described above with respect to FIG. 4, the URL directs or redirects the mobile computing device to a download location for downloading a banking app, which, for example, may be a World Wide Web page. As illustrated, the user may land on a download interface 502 if the user does not already have the banking app installed on the mobile device. In examples, the download interface 502 may include screen 504 that indicates the requisite banking app has not yet been downloaded to the mobile device and instructs the user to download the banking app. To do so, the user may select or press the icon 506, which begins the download process.

After the banking app has been downloaded, the mobile device may automatically launch the app. As illustrated in screen 508, a banking app 510 may request that the user complete registration via the begin registration icon 512. The registration process may involve the user providing personal information or other types of user-related information involved in setting up a user account, such as creating a username, password, and setting up one-tap authentication, which will be further described below. Once the registration process has been completed by the user, the banking app 510 may instruct the user to initiate the activation process. For example, screen 514 may ask the user to point the camera of the mobile device at the card and press the begin activation icon 516. In other examples, the user can select the begin activation icon 516 first and then point the camera at the card.

In other embodiments, the banking app 510 may already be downloaded and installed on the mobile device. In that instance, the banking app may be automatically opened and launched when the mobile device reads or receives the URL from the card, as indicated by the dashed lines in FIG. 5. As shown, the user may be instructed to login to the banking app 510 via screen 520. To login, the user may perform one or more various types of authentication. For example, the user may login by providing a username and password. In another example, the user may perform one-tap authentication to login.

According to embodiments, one-tap authentication may involve the user placing, tapping, or bringing near a contactless card to a designated area of the user's mobile device. The user computing device may detect the contactless card via near field communication (NFC) and receive one or more cryptograms from the contactless card. Information contained in the cryptogram(s), which may identify the true owner of the contactless card, may be compared or matched against authentication information related to the user logging in to the banking app. If they match, a successful user identity verification can be confirmed. In some examples, the contactless card used to perform the one-tap authentication may be an already existing, active card belonging to the user. In other examples, the new card—the card that is being activated—may be used to perform the one-tap authentication. It may be understood that a cryptogram may broadly refer to any encrypted text, data, or information. It may further be understood that the one or more cryptograms may be received as NFC data exchange format (NDEF) messages.

In examples, the one or more received cryptograms may contain information at least identifying the user or other related information indicating that the card belongs to a particular user. For instance, the card-user information may be any type of data or information (e.g., ID number, customer number, etc.) associating the contactless card to the user, which may be created or established when the contactless card is created for the user and/or at backend systems when the user signs up or applies for the contactless card. Afterwards, the information contained in the one or more received cryptograms may be matched or compared against authentication information associated with the user to verify the identity of the user. The authentication information is any type of data or information identifying the user signed-in to the banking app (e.g., ID number, customer number, etc.).

In one example, the banking app 510 may receive the one or more cryptograms from the contactless card and send the cryptogram(s) to one or more remote computing devices, which may be secure backend servers, to perform the decryption of the cryptograms and determine whether the information contained in the one or more cryptograms match authentication information related to the user. The one or more remote computing devices may then send to the banking app 510 an indication or confirmation of verification of the user's identity. In at least that regard, most (if not all) of the identity verification process may be performed at one or more secure and remote computing devices, which may be advantageous in certain applications or use cases.

In another example, the banking app 510 may be configured to decrypt the one or more cryptograms received from the contactless card using at least one key (e.g., a private key, a decryption key, a key corresponding to a specific encryption-decryption scheme). The banking app 510 may securely access or receive authentication information related to the user from one or more remote computing devices, such as backend servers. The authentication information may contain at least an identifier or any information indicating the identity of the user logged into the banking app 510. The banking app 510 may then determine whether the received authentication information and the decrypted cryptogram information received from the contactless card match to verify that the contactless card actually belongs to the user and/or to verify that the user is actually the user claims to be.

Upon successful verification and authentication of the user's identity, the banking app 510 may display an indication that the user has successfully logged in. Thereafter, the user may continue with the card activation experience within the banking app 510, as will be further described below.

Figure 6:
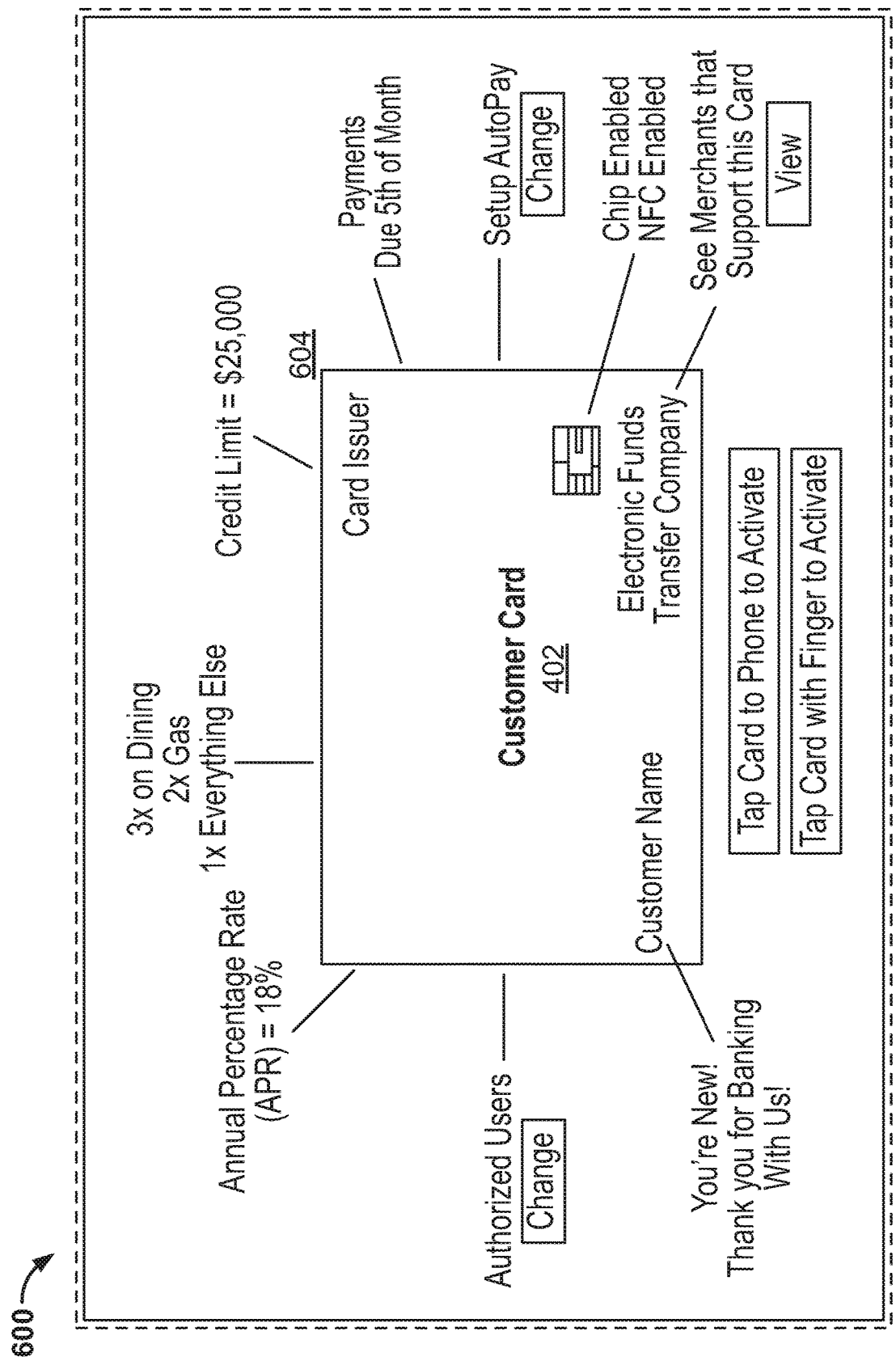
FIG. 6 illustrates a first example of card information displayed in augmented reality (AR) in accordance with one or more embodiments.

FIG. 6 illustrates card information 600 displayed in augmented reality (AR) according to one or more embodiments. When the customer card 402 (e.g., front-side forward) is placed in front of the camera of the user's mobile device, the banking app 510 may display various types of card information in AR during the activation experience.

As shown, card information 600 may include an annual percentage rate (APR) associated with the customer card 402 and may be displayed in AR adjacent to the card. For example, the APR may be eighteen percent. As further shown, a line or any suitable indicator may virtually connect the APR information to the card. The line or indicator may be any color, size, thickness, shape, etc. that allows the information to be easily read or deciphered by the user. Moreover, credit limit information may be displayed in AR (e.g., $25,000) adjacent to the card 402. Further, payment due date information may also be displayed adjacent to the card. As shown, for instance, a minimum payment may be due every fifth of each month.

In further embodiments, user selectable options associated with the customer card may also be displayed adjacent to the card in AR. The user selectable options may be related to, for instance, adding or subtracting authorized card users or setting up or modifying autopay. As illustrated, the user may be able to interact with the "change" icon displayed in AR under the "authorized users" AR component. In response to touching, pressing, or otherwise selecting the change icon, the user may be able to add, subtract, or modify authorized users of the customer card 402. Similarly, the user may select or press the "change" icon under the "setup autopay" AR component. In response, the user may be able to enroll or disenroll in autopay or modify features associated therewith.

In yet further embodiments, other types of information, such as information related to components graphically depicted or physically indicated on the customer card 402 itself, may be displayed adjacent to the card in AR. As shown, information related to the embedded microchip may be displayed (e.g., "chip enabled" or "NFC enabled"). If the customer is a new customer, words of appreciation can be displayed next to the customer's name (e.g., "you're new! Thank you for banking with us!"). In other examples, next to the electronic funds transfer company graphic (e.g., company facilitating the exchange of funds associated with the card transactions), the user may select the "view" icon under the "see merchants that support this card" AR component to view information regarding the respective merchants or businesses that support the customer card 402.

In examples, a border or outline of the customer card 402 can be color coded in AR to indicate activation-related information. For instance, the border 604 customer card 402 may be outlined in red to indicate that the card 402 has not yet been activated and thus cannot be used at merchants. As will be further described below, upon completing the activation process, the border 604 of the card 402 may be outlined in green to indicate that the user has successfully activated the card.

As further illustrated, at least two activation instructions may be displayed in AR underneath the customer card 402, both of which will be further explained below with respect to at least FIG. 8. In one example, the user may be instructed to tap the card 402 to the mobile device to complete the activation experience. In another example, the user may be instructed to physically tap the card with the user's finger to complete the activation experience.

Since the user may view the card information 600 in AR from different angles and at different positions, it may be understood that the banking app 510 may be configured to perform automatic scaling or scale-to-fit procedures such that the card information 600 remain displayed in their respective and correct positions relative to the customer card 402 regardless of the differing viewing angles or positions.

Figure 7:
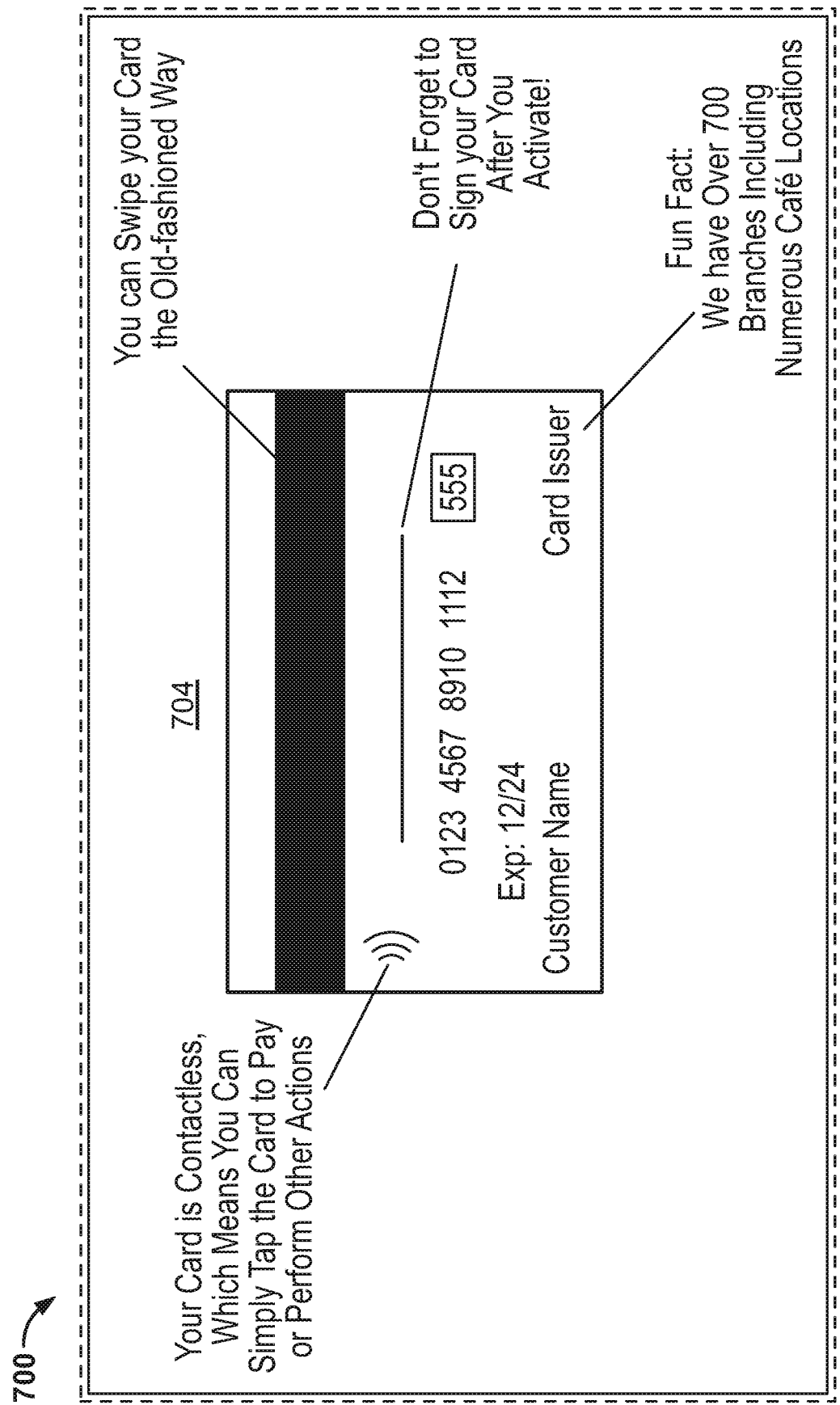
FIG. 7 illustrates a second example of card information displayed in AR in accordance with one or more embodiments.

FIG. 7 illustrates card information 700 displayed in augmented reality (AR) according to one or more embodiments. As shown, the backside of the customer card 402 may be placed in front of the camera of the user's mobile device during the activation experience, which causes the banking app 510 to display card information 700 in AR.

Similar to the card information 600, described above, card information 700 may also include various types of information about different components (graphical or otherwise) arranged, depicted, or illustrated on the back of the card 402. For example, information related to the graphic or symbol indicating that the customer card 402 is contactless may be virtually displayed adjacent to the card and read "Your card is contactless, which means you can simply tap the card to pay or perform other actions." In a further example, information related to the magnetic stripe may displayed in AR adjacent to the stripe and state "You can swipe your card the old-fashioned way."

Moreover, reminder information may be displayed in AR, such as "Don't forget to sign your card after you activate" adjacent to the signature line. In yet another example, various facts can be displayed, such as "Fun Fact: We have over 700 branches and numerous café locations" adjacent to the card issuer graphic on the back of the customer card 402. And similar to the border 604 described above, a border 704 may be displayed around the card 402 and may be color-coded (e.g., red) to indicate that the card still has not yet been activated.

In examples, the card activation experience may be advantageously enhanced by the banking app 510 seamlessly transitioning AR display from information 600 to information 700 as the user flips the customer card 402 from the front-side to the backside, and transitioning AR display from information 700 to information 600 as the user flips the card 402 from the backside to the front-side. In at least that regard, the user may be able to enjoy a wholly interactive card activation experience in augmented reality with the physical card itself.

Figure 8:
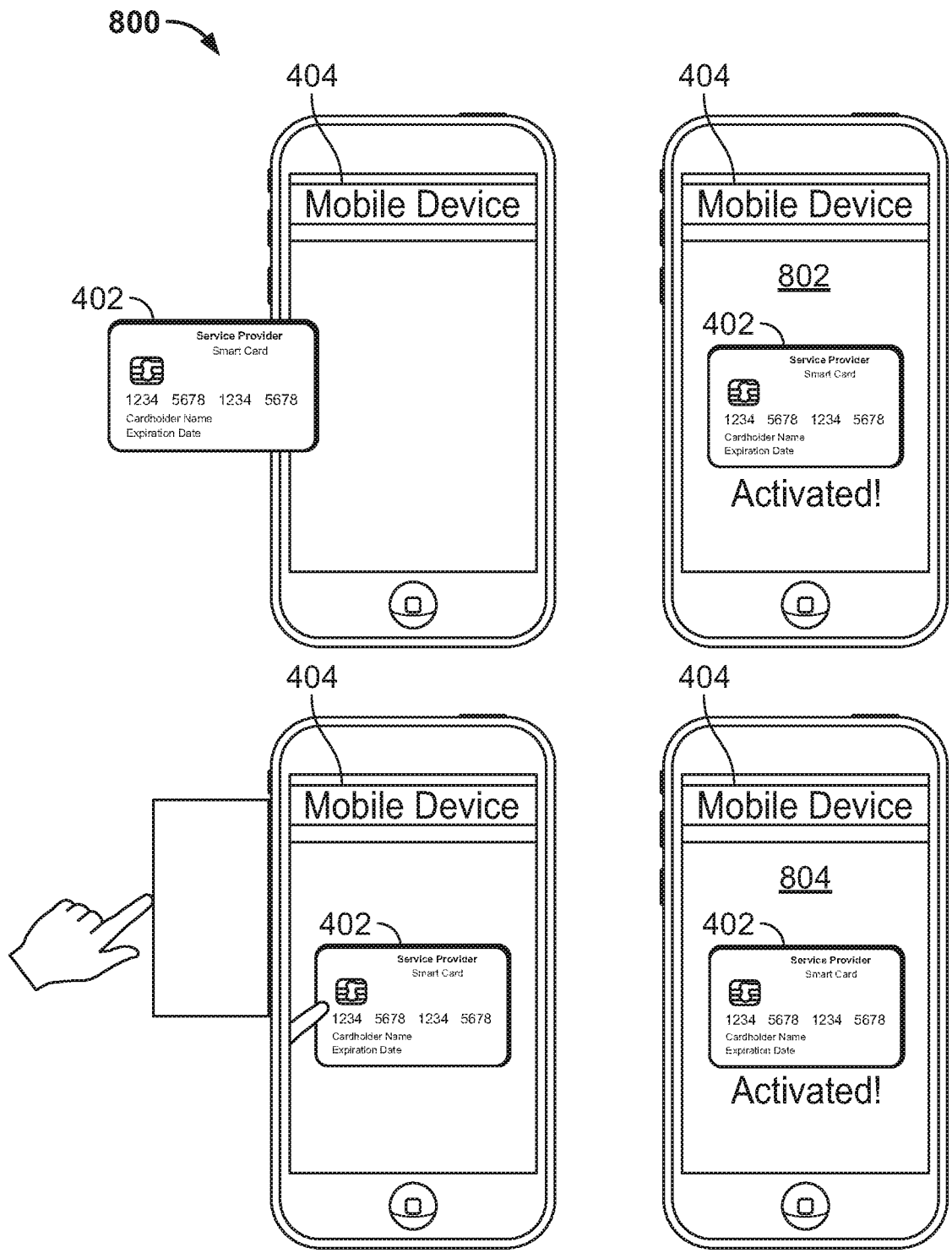
FIG. 8 illustrate example card activation actions in accordance with one or more embodiments.

FIG. 8 illustrate example card activation actions 800 according to one or more embodiments. At least two different activation actions are shown: tapping the customer card 402 to the mobile device 404 and tapping the card 402 itself with the user's finger.

After the user has experienced the display of the card information 600 and 700 in AR, the user may wish to complete the activation experience and officially activate the card. In one example, the user may tap the customer card 402 to the mobile device 404, which the banking app 510 may detect, to activate the card. Upon detecting that the card 402 has been tapped, the mobile device 404 via the banking app 510 may communicate with one or more backend servers to signal that a card activation action has been performed and to confirm official activation of the card so that the customer card 404 is active and ready for use. After tapping the card to the phone, the user may place the card 402 back in front of the camera of the mobile device 404. As shown, a border 802 around the card 402 may now be color-coded, e.g., in green, to indicate that the card has been successfully activated.

In another example, the user may tap the customer card 402 with the user's finger in front of the camera of the mobile device 404. Similar to the card tapping action, this finger tapping action may cause the banking app 510 to communicate with the one or more backend servers to complete the activation process. As further illustrated, a border 804 around the card 402 may also be color-coded, e.g., in green, to indicate that the card has been successfully activated and ready for use.

Figure 9:
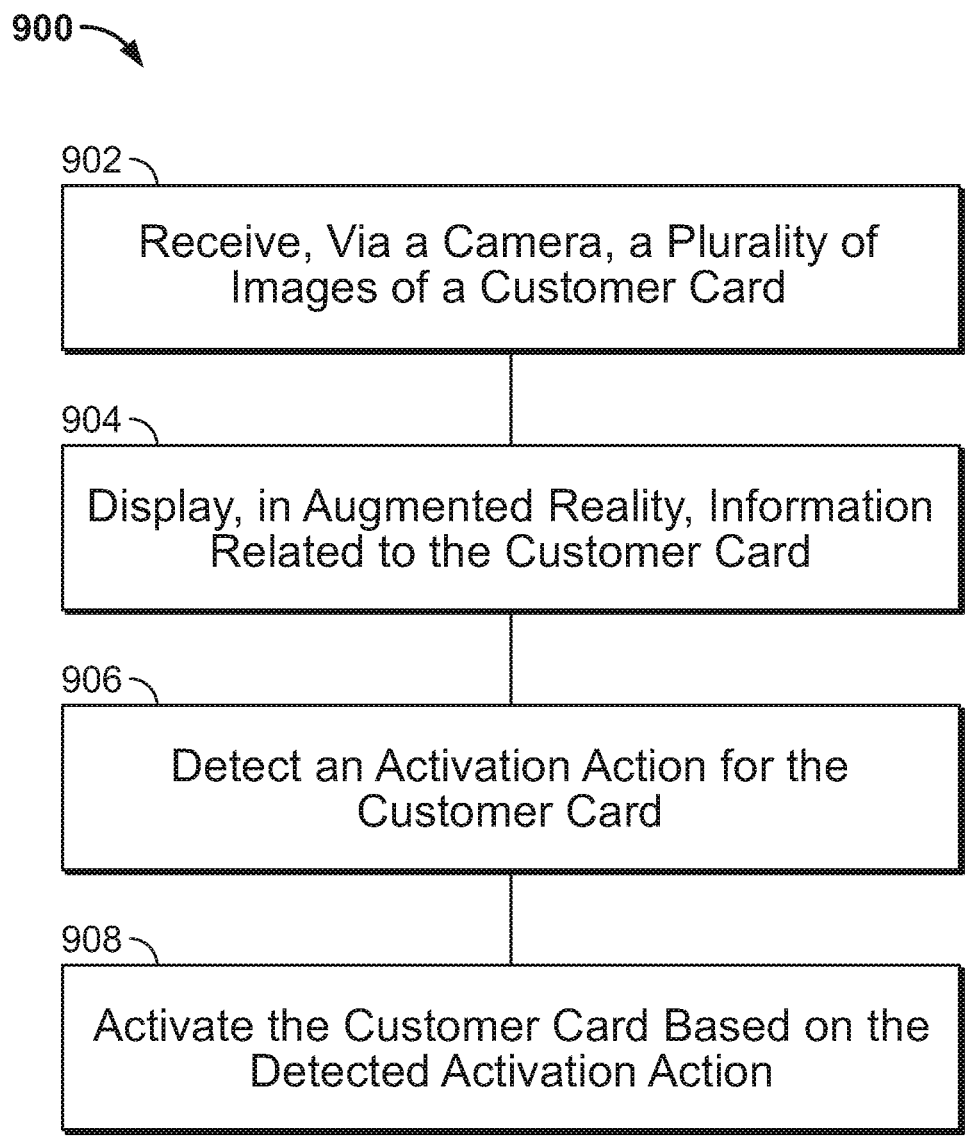
FIG. 9 illustrates an example flow diagram in accordance with one or more embodiments.

FIG. 9 illustrates an example flow diagram 900 according to one or more embodiments. The flow diagram 900 is related to enhancing a card activation experience by displaying various types of card information in augmented reality. It may be understood that the blocks of the flow diagram 900 and the features described therein are not required to be performed in any particular order. Moreover, it may be understood that the flow diagram 900 and the features described therein may be executed by one or more processors.

At block 902, a plurality of images of a customer card may be received by a camera of, e.g., a mobile computing device. The customer card may be a new card associated with an authorized user that requires activation and may be placed in front of the camera. The images may be processed by a banking app, which may be downloaded and installed (if not already downloaded and installed on the mobile device) via a URL reading, as described above.

At block 904, information related to the customer card may be displayed in augmented reality (AR). In examples, information such as the credit limit, annual percentage rate, and due date of monthly minimum payments may be displayed adjacent to the card. In further examples, information related to selectable options associated with the card, such as adding or subtracting authorized users and setting up autopay may be displayed. The user may select an AR icon to change these options, as described above. Moreover, information related to various components arranged on or graphically or textually depicted on the card may be displayed. For example, "chip enabled" may be displayed in AR adjacent to the card chip. Other types of information, such as a statement thanking the customer for being a customer can be displayed next to the customer's name on the card. Card information for both the front and back of the card may be displayed in AR.

At block 906, an activation action for the customer card may be detected. As described above, the activation action may be tapping the card to the mobile device. In another example, the action may be tapping the card with the user's finger. When the activation action is detected, the customer card may be activated at block 908. The successful activation of the card may be communicated to the user by displaying an indication in AR, such as color coding, e.g., in green, the outline of the card.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
   a near-field communication (NFC) reader;
   memory to store instructions; and
   one or more processors, coupled with the memory, operable to execute the instructions that, when executed, cause the one or more processors to:
   determine whether a contactless card is in near-field communication with the NFC reader and receive, via the near-field communication, a uniform resource locator (URL) from the contactless card, wherein the URL directs to a download location for a banking app;
   determine whether the banking app is already available on the apparatus;
   in response to the banking app not being available, download the banking app from the download location provided by the URL and launch the banking app;
   in response to the banking app being available, launch the banking app;
   determine, via the banking app, that a customer card is to be activated;
   receive, via a camera, a plurality of images of the customer card;
   identify at least a first component of the customer card based on the received plurality of images;
   display in augmented reality (AR), via the banking app, first information related to the first component of the customer card adjacent to the first component based on the received plurality of images;
   display in AR, via the banking app, second information related to the customer card adjacent to or on the customer card based on the received plurality of images;
   display in AR, via the banking app, third information related to a user selectable control for the customer card adjacent to the customer card based on the received plurality of images;
   detect an activation action for the customer card;
   activate the customer card based on the detected activation action; and
   display in AR, via the banking app, notification of successful activation of the customer card.

2. The apparatus of claim 1, wherein the one or more processors are further caused to:
   upon the launching of the banking app, (i) perform registration procedures of a user associated with the customer card if the user is a new user or (ii) perform login procedures of the user if the user is an existing user; and
   determine that the customer card is to be activated.

3. The apparatus of claim 2, wherein the URL is included in the customer card, a sticker, or a QR code, and wherein the one or more processors are further cause to receive the URL when customer card is brought near or tapped to the apparatus, the sticker is brought near, read or scanned by the apparatus, or the QR code is brought near, read or scanned by the apparatus.

4. The apparatus of claim 2, wherein the one or more processors are further caused to:
   verify, based on the received plurality of images of the customer card, that the customer card belongs to the user and is actually the customer card to be activated, and
   wherein the verification comprises matching account information on the customer card to the user.

5. The apparatus of claim 1, wherein the one or more processors are further caused to:
   identify a second component of the customer card based on the received plurality of images; and
   display in AR, via the banking app, fourth information related to the second component of the customer card adjacent to the first component based on the received plurality of images.

6. The apparatus of claim 5, wherein the first component or the second component is a graphical indication, text, or a physical component arranged on the customer card.

7. The apparatus of claim 1, wherein the second information related to the customer card comprises: (i) an annual percentage rate (APR) associated with the customer card, (ii) a credit limit associated with the customer card, (iii) payment due date associated with the customer card, and/or (iv) instructions for activating the customer card.

8. The apparatus of claim 1, wherein the third information related to the user selectable control comprises: (i) adding or removing one or more authorized users to the customer card or (ii) updating, changing, or setting up autopay for the customer card, and wherein the user selectable control allows a user associated with the customer card to add or remove the one or more authorized users or allows the user to update, change, or set up the autopay.

9. The apparatus of claim 1, wherein the activation action comprises: (i) the customer card being brought near or tapped to the apparatus or (ii) the customer card being tapped by a user.

10. A method comprising:
determining, via one or more processors, whether a contactless card is in near-field communication (NFC) with an NFC reader and receiving, via the near-field communication, a uniform resource locator (URL) from the contactless card, wherein the URL directs to a download location for a banking app;
determining, via the one or more processors, whether the banking app is already available;
in response to the banking app not being available, downloading the banking app from the download location provided by the URL and launching the banking app;
in response to the banking app being available, launching the banking app;
determining, via the one or more processors, that a customer card is to be activated;
receiving, via a camera, a plurality of images of the customer card;
displaying in AR, via the one or more processors, information related to the customer card adjacent to or on the customer card based on the received plurality of images;
detecting, via the one or more processors, an activation action for the customer card;
activating, via the one or more processors, the customer card based on the detected activation action; and
displaying in AR, via the one or more processors, notification of successful activation of the customer card.

11. The method of claim 10, wherein the information related to the customer card comprises: (i) an annual percentage rate (APR) associated with the customer card, (ii) a credit limit associated with the customer card, (iii) payment due date associated with the customer card, and/or (iv) instructions for activating the customer card.

12. The method of claim 11, wherein the activation action comprises: (i) the customer card being brought near or tapped to the apparatus or (ii) the customer card being tapped by a user.

13. The method of claim 12, wherein the notification of the successful activation of the customer card comprises displaying in AR, via the one or more processors, a colored border or outline around the customer card.

14. The method of claim 11, further comprising:
verifying, based on the received plurality of images of the customer card, that the customer card belongs to a user associated with the customer card and is actually the customer card to be activated, and
wherein the verifying comprises matching account information on the customer card to the user.

15. A non-transitory computer-readable storage medium storing computer-readable program code executable by at least one processor to:

determine whether a contactless card is in near-field communication (NFC) with an NFC reader and receive, via the near-field communication, a uniform resource locator (URL) from the contactless card, wherein the URL directs to a download location for a banking app;
determine whether the banking app is already available;
in response to the banking app not being available, download the banking app from the download location provided by the URL and launch the banking app;
in response to the banking app being available, launch the banking app;
determine, via the banking app, that a customer card is to be activated;
receive, via a camera, a plurality of images of the customer card;
display in AR, via the banking app, information related to the customer card adjacent to or on the customer card based on the received plurality of images;
detect an activation action for the customer card;
activate the customer card based on the detected activation action; and
display in AR, via the banking app, notification of successful activation of the customer card.

16. The non-transitory computer-readable storage medium of claim 15, wherein the information related to the customer card comprises: (i) an annual percentage rate (APR) associated with the customer card, (ii) a credit limit associated with the customer card, (iii) payment due date associated with the customer card, and/or (iv) instructions for activating the customer card.

17. The non-transitory computer-readable storage medium of claim 15, wherein the computer-readable program code further causes the at least one processor to:
upon the launching of the banking app, (i) perform registration procedures of a user associated with the customer card if the user is a new user or (ii) perform login procedures of the user if the user is an existing user; and
determine that the customer card is to be activated.

18. The non-transitory computer-readable storage medium of claim 17, wherein the URL is included in the customer card, a sticker, or a QR code, and wherein the one or more processors are further cause to receive the URL when customer card is brought near or tapped to the apparatus, the sticker is brought near, read or scanned by the apparatus, or the QR code is brought near, read or scanned by the apparatus.

19. The non-transitory computer-readable storage medium of claim 17, wherein the computer-readable program code further causes the at least one processor to:
verify, based on the received plurality of images of the customer card, that the customer card belongs to the user and is actually the customer card to be activated, and
wherein the verification comprises matching account information on the customer card to the user.

20. The non-transitory computer-readable storage medium of claim 15, wherein the activation action comprises: (i) the customer card being brought near or tapped to the apparatus or (ii) the customer card being tapped by a user.

* * * * *